Feb. 22, 1966  W. SHOCKLEY  3,236,698
SEMICONDUCTIVE DEVICE AND METHOD OF MAKING THE SAME
Filed April 8, 1964  3 Sheets-Sheet 1

WILLIAM SHOCKLEY
INVENTOR.

BY
Flehr and Swain
ATTORNEYS

WILLIAM SHOCKLEY
INVENTOR.

BY
ATTORNEYS

Feb. 22, 1966 W. SHOCKLEY 3,236,698
SEMICONDUCTIVE DEVICE AND METHOD OF MAKING THE SAME
Filed April 8, 1964 3 Sheets-Sheet 3

WILLIAM SHOCKLEY
INVENTOR.

BY
Flehr and Swain
ATTORNEYS

United States Patent Office 3,236,698
Patented Feb. 22, 1966

1

3,236,698
SEMICONDUCTIVE DEVICE AND METHOD OF
MAKING THE SAME
William Shockley, Los Altos, Calif., assignor to
Clevite Corporation, a corporation of Ohio
Filed Apr. 8, 1964, Ser. No. 358,224
5 Claims. (Cl. 148—33)

This application is a continuation-in-part of my copending application Serial No. 97,777, filed March 23, 1961 which is a continuation of my copending application Serial No. 782,782, filed December 24, 1958 which was a continuation-in-part of my copending application Serial No. 722,577, filed March 19, 1958, and Serial No. 637,244, filed January 30, 1957 (all cases are abandoned).

This invention relates generally to semiconductive devices and methods of making the same and more particularly to devices of the above character in which the characteristic voltage is controlled by an inner region of the device.

In the manufacture of junction semiconductive devices, the regions of different conductivity types are of uniform thickness and impurity concentration and extend to the surface of the device. As is well known, certain of the regions are relatively thin, and the spacing between regions at the surface is consequently small. Moisture, dirt, oxide layers, oil films and the like on the surface provide paths for leakage current. The surface conditions may also lead to breakdown voltages which are considerably lower than those for the atmosphere separating the regions themselves or for the junctions in the interior of the device.

In many applications, there is a need for a device which can be readily transferred from a high impedance condition to a low impedance condition by application of a controlling voltage. Single semiconductive devices and combinations of devices have been employed.

Single devices may, for example, comprise four layers (p-n-p-n). Four layer semiconductive devices comprise a single body having four successive layers, with contiguous layers being of opposite conductivity type to form three junctions. Ohmic connections are made to the outer layers. In operation, the device is connected so that the voltage which it controls reversely biases the center junction. Prior to application of a switching voltage, the device exhibits relatively high impedance corresponding to the characteristics of the reversely biased center junction. However, upon application of a switching voltage, the device exhibits negative resistance characteristics. The impedance between the terminals of the device then becomes relatively low and the voltage required to carry holding current for the low impedance condition is small in comparison to that required for switching the device from the high impedance to low impedance conditions.

Devices of the prior art include layers which have uniform thickness and concentration gradients to the point where the junction meets the surface. Surface conditions affect the breakdown voltage at the center junction in the manner previously described.

As described, four layer devices exhibit negative resistance characteristics which are desirable in certain circuit applications, for example, in oscillators. However, when the devices are used for switching purposes, this characteristic is disadvantageous if it begins at too small currents. The device may be triggered from its high impedance condition to its low impedance condition by rapidly changing voltage such as a voltage pulse, which has an amplitude less than the breakdown voltage of the device. This is believed to be due to the fact that the capacitance of the center junction is such that upon application of a rapidly changing voltage, high charging current for this capacitance triggers the device into its low impedance state.

Devices of the type described which have low breakdown voltages are relatively difficult to fabricate. For low breakdown voltages, the device must either be constructed with high concentration gradients at the center junction or with relatively thin center layers. In the former case, high holding currents are required to maintain the device in a low impedance condition, and in the latter, the device is relatively difficult to fabricate.

Circuit combinations of devices which do not suffer from the aforementioned disadvantages are described in Patent No. 2,655,609, dated Oct. 13, 1953. This patent discloses that a combination of a pair of junction transistors (n-p-n and p-n-p configuration) interconnected with the base of each being connected to the collector of the other and the emitter of each adapted to be connected to an external circuit will exhibit characteristics comparable to the four layer device described above. However, such circuits are relatively expensive since they require a plurality of individual devices.

It is a general object of the present invention to provide an improved semiconductive device and method of making the same.

It is another object of the present invention to provide a semiconductive device which includes an inner region which controls certain characteristics of the device and a surrounding or guarding region which overcomes the aforementioned disadvantages characteristic of devices having uniform layers.

It is another object of the present invention to provide semiconductive devices which are relatively immune to external conditions.

It is another object of the present invention to provide a semiconductive device which can withstand relatively large voltages at the surface and a method of making the same.

It is a further object of the present invention to provide a semiconductive device having contiguous with a plurality of layers of opposite conductivity type forming junctions, the contiguous regions of said device of different impurity concentrations whereby the regions have different operating characteristics.

It is still a further object of the present invention to provide a junction semiconductive device which includes an inner region and an outer surrounding or guarding region in which avalanche breakdown occurs at lower voltages at a junction in the inner region.

It is a further object of the present invention to provide a semiconductive device which includes at least two layers of opposite conductivity type forming a junction, said device including an inner region having a high concentration gradient at the junction and an outer region contiguous with and surrounding the inner region and having a low concentration gradient at the junction so that the carrier multiplication due to avalanche occurs at lower voltages at the junction in the inner region.

It is a further object of the present invention to provide semiconductive devices and method of making the same in which the regions extending to the surface are relatively thick with relatively thin operating regions formed in the operating portions of the device.

It is another object of the present invention to provide a four layer semiconductive device which is not triggered by rapidly changing voltages and thus are not susceptible to $dV/dt$ effect.

It is still another object of the present invention to provide a semiconductive device in which the breakdown voltage may be easily set during manufacture and which requires low holding currents.

It is still another object of the present invention to provide a four layer semiconductive device having two regions, one of which controls the holding current characteristics and the other of which controls the breakdown characteristics of the device.

It is a further object of the present invention to provide a four layer semiconductive device including a first region having relatively high concentration gradients at the center junction and a second region having relatively low concentration gradients at the center junction.

It is still another object of the present invention to provide a four layer semiconductive device comprising first and second contiguous regions with the first region having a relatively high concentration gradient at the center junction, and the second region having a relatively low concentration gradient at the center junction with the alphas of the center layer of the second region rising to a combined value greater than one at currents through the device substantially below that for a similar situation for the center junction of the first region.

The invention possesses other objects and features of advantage some of which with the foregoing will be set forth in the following description of the invention. It is to be understood, of course, that the invention is not to be limited to the particular disclosure of species of the invention, as other variant embodiments may be adopted within the scope of the appended claims.

Referring to the drawings.

Figure 10:
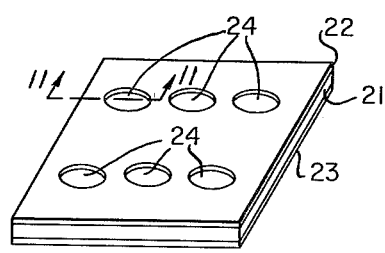
FIGURE 10 is a perspective view showing a slice of semiconductive material which may be employed in one method of fabrication of semiconductive devices of the present invention.
Figure 13:
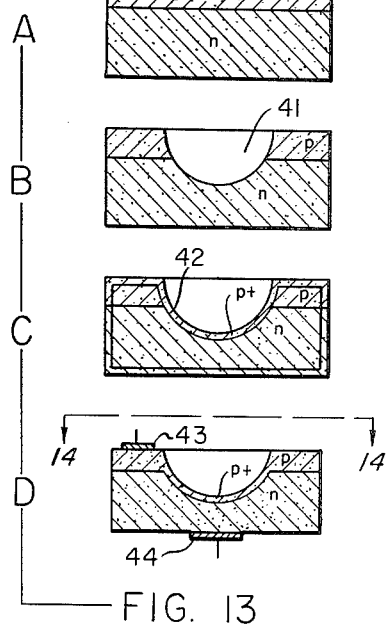
Figure 14:
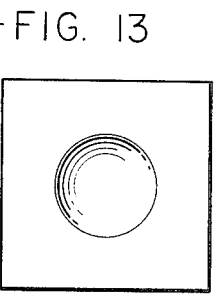
Figure 15:
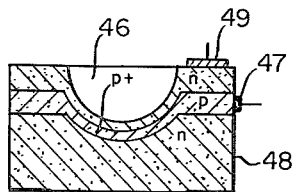
Figure 16:
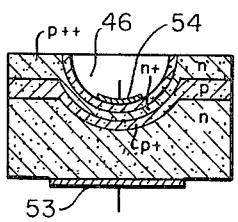
Figure 17:
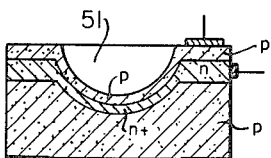
Figure 18:
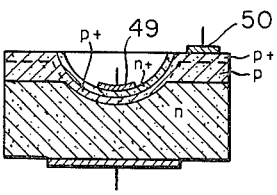
Figure 19:
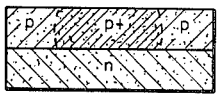
Figure 20:
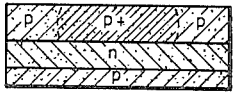
Figure 21:
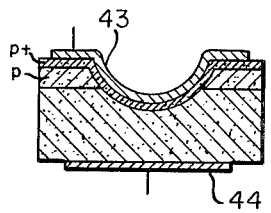
Figure 22:
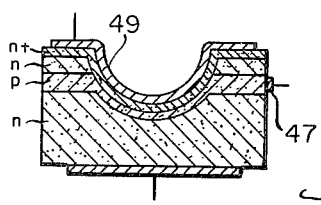

FIGURES 11A–G show the steps in the fabrication of a four layer device and two and three layer devices from the slice shown in FIGURE 10;

FIGURES 12A–F show another method of fabricating semiconductive devices in accordance with the present invention;

FIGURES 13A–D show a p-n junction semiconductive device incorporating the present invention and a method of fabricating the same;

FIGURE 14 is a plan view of the device of FIGURE 13;

FIGURE 15 is a sectional view of an n-p-n junction device incorporating the present invention;

FIGURE 16 is a sectional view showing a p-n-p-n switching device incorporating the present invention;

FIGURE 17 shows a p-n-p device incorporating the present invention;

FIGURE 18 is a sectional view of another n-p-n junction device incorporating the present invention;

FIGURE 19 is a sectional view of a p-n junction device incorporating the present invention;

FIGURE 20 is a sectional view of a p-n-p junction device incorporating the present invention;

FIGURE 21 shows a modified form of a device in accordance with FIGURES 13A–D; and FIGURE 22 shows a modified form of the device of FIGURE 15.

Generally, there is provided a semiconductive device which has an inner region which at least initially controls the characteristics of the device as the voltage rises towards a critical value and an outer surrounding (guarding) region which protects the device against the surrounds and which in the four layer device can be made to but need not necessarily control the holding characteristics. These characteristics are achieved by devices of the type shown in the figures in which the impurity concentration in the various regions of the devices are different. For example, the devices may have relatively low concentration gradient junctions at the surface and high concentration gradient junctions at the center.

A clear understanding of how the invention operates to improve the characteristics of four layer devices will facilitate the understanding of how the invention is applicable to two and three layer devices. Thus, initially, four layer devices are described.

The theory of four layer diode action is well known and may be found disclosed in the literature, for example, Moll et al., Proceedings of the IRE, September 1956. In order to follow the teaching of this invention, the following amplification is helpful.

Figure 1:
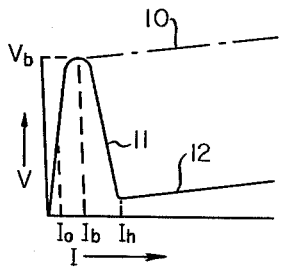
FIGURE 1 shows the voltage-current characteristics of a conventional four layer semiconductive device.

As previously described, a four layer semiconductive device in accordance with the prior art includes four layers with adjacent layers being of opposite conductivity type to form three junctions. The junctions are formed whereby they have substantially uniform properties over their entire area. Referring to FIGURE 1, a curve showing the current-voltage characteristics of such a device is presented. In order fully to understand the curve, two basically different effects which play cooperative roles are considered. A voltage applied to the device which reversely biases the center junction and which is below the breakdown voltage of the junction causes generation of hole-electron pairs at the junction. As the applied voltage is increased, there is secondary generation. If the device were a single junction device, a voltage would be reached where avalanche would set in at the junction. Further slight increases in voltage would result in considerable current increase, as indicated by the dashed line 10, FIGURE 1.

The second effect arises from a consideration of the other junctions. In this respect, the device may be regarded as a pair of interconnected transistors with the middle layers being the base and collector layers for the two transistors, and the outer layers being the emitter layers. Considering the outer junctions which act as the emitter junctions of each of the transistors, hole current $I_p$ generated at the center junction flows to the adjacent p-type layer and would tend to give this layer a positive charge, if the device were open circuited. However, when the device is in a closed circuit with applied voltage, hole accumulation is prevented by forward biasing of the associated emitter junction. This causes injection of electrons which flow into and across the adjacent layer, for example, the p-type layer, and are collected by the n-type base layer. This injected current produces a current $$\frac{\alpha I_p}{1-\alpha}$$

at the collector or center junction. However, because of the large voltage applied at the center junction, this electron current is multiplied by avalanche multiplication before it reaches the adjacent n-type layer. The breakdown voltage $V_b$ of FIGURE 1 is such that avalanche multiplication makes up for the low values of alpha to the point that the gain approaches unity in the following sequence of processes: The avalanche-multiplied electron current is collected in the n-type center layer and the adjacent outer junction is consequently biased forward whereby it provokes a hole current again larger by a factor involving the alpha for the p-n-p structure. This hole current is multiplied by avalanche and collected at the p-type center layer to produce forward bias at the adjacent outer junction. If the gain in this sequence of processes is greater than unity and the device is connected to a constant current source, the current will tend to build up spontaneously and to discharge the capacity of the center junction and reduce the avalanche gain so that a stable condition results.

The negative resistance portion 11 of the curve may be explained as follows. As the total current increases, the multiplication factor due to the alpha factors becomes larger, thus avalanche multiplication needed to sustain the current decreases. The avalanche multiplication depends on the voltage and decreases as the voltage decreases. Thus, increasing current results in decreasing voltage across the device. Finally, the current becomes large enough that the sum of the alphas of the two transistors becomes equal to one. Under these conditions, electron flow between the two n-type layers and holes flow between the p-type layers so efficiently that layers of like conductivity type are effectively connected together and the device acts much like three p-n junctions in parallel all forward biased. This gives the low resistance branch 12, FIGURE 1. Most of the resistance of this branch arises from the series resistance rather than the junction resistance. To maintain the device in its low impedance condition, a holding current $I_h$ must flow through the device, otherwise the sum of the alphas becomes less than one and the device reverts to its high impedance condition.

To operate in the manner described, the device must be made of material in which the transistors have increasing alpha with increasing current. Silicon is a material which exhibits these characteristics, thus the device may be a four layer silicon device. Alternatively, the device may be constructed to include a resistance path in shunt with the emitter p-n junctions. As is well known, this will also give rise to an increasing alpha with increasing current.

From the foregoing description, it is apparent that a device of the character described can be triggered by rapidly changing voltages having an amplitude less than the avalanche voltage of the center junction. This may be explained as follows: The voltage across the device increases at a rapid rate, then in addition to the saturation current $I_o$ across the middle junction, represented by the initial increasing current of FIGURE 1, there is also a capacitive charging current. This is not carried by electrons flowing across the center junction but is a dielectric displacement current. However, at the outer (emitter) junctions, injection of carriers occurs as a result of this current. The alpha is in effect raised, and may be raised sufficiently to to raise the sum of the alphas to a sufficiently high value that the negative resistance condition occurs before the breakdown voltage $V_b$ is reached. Under these conditions, the device is brought into its breakdown or low impedance condition by applying a voltage lower than the switching voltage. This is referred to as the $dV/dt$ effect.

Figure 2:
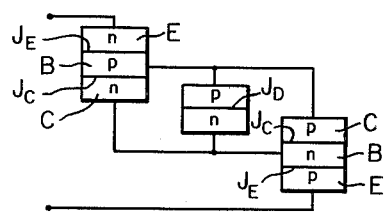
FIGURE 2 shows a suitable configuration for a plurality of devices exhibiting suitable switching characteristics.

A combination of devices suitable for switching purposes is disclosed in Patent No. 2,655,609, referred to above. FIGURE 2 of the drawing shows a circuit combination in accordance with the disclosure of the aforesaid patent. The circuit shown does not include a pair of resistors connected across the emitter junctions of each of the transistors since it is assumed that the devices employed are silicon devices in which alpha increases with current. However, for devices which do not have such a characteristic, it is understood that a resistor is connected across the emitter junction.

The combination shown includes a pair of transistors (n-p-n) and (p-n-p) each having emitter, base and collector layers E, B and C forming emitter junctions $J_E$ and collector junctions $J_C$. The base of each of the transistors is connected to the collector of the other transistor. A diode element having a junction $J_D$ is connected between the base and collector of the devices. The collector junctions $J_C$ of the two transistors are selected with avalanche voltages which are substantially higher than the avalanche voltage of the diode junction $J_D$.

Figure 3:
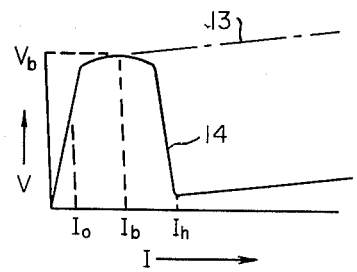
FIGURE 3 shows the voltage-current characteristics of a circuit in accordance with FIGURE 2 or a four layer semiconductive device in accordance with the present invention.

With an applied voltage of polarity which reversely biases the collector junctions $J_C$ and the diode punction $J_D$, a current $I_o$ (FIGURE 3) will flow through in the circuit. The current flows primarily through the diode element. The voltage drop appears primarily across the reversely biased junctions. As the voltage is increased, it approaches a breakdown value for the diode junction. Current then increases rapidly with increasing voltage through the diode, which acts as a "Zener" or avalanche diode. The diode characteristics are substantially as shown by the dashed line 13, FIGURE 3. The current flowing across the collector junctions of the transistors is not multiplied, since the voltage applied to the junction is substantially below the avalanche voltage. As the voltage is increased, the current through the diode increases as shown in FIGURE 3. However, it is apparent that some of the current injected at the two emitter junction $J_E$ will flow across the collector junction $J_C$ and be collected by the collector region C. When the collected current reaches a sufficiently high value, the sum of the alphas of the two transistors will become sufficiently large that an appreciable fraction of the current I flows across their collector junctions.

The current through the avalanche diode then decreases, the voltage across it drops and the negative resistance portion 14 of the curve rises. The voltage required to carry current from a constant current source then drops abruptly over a current range comparable to the saturation current of the diode until the sustaining voltage $V_h$ and current $I_h$ are reached.

Thus, it is seen that the diode controls the breakdown or triggering voltage but that once the circuit is triggered into its low impedance condition the holding current is controlled entirely by the associated transistors.

The circuit combination described is very much less susceptible to being triggered by sharply increasing voltages for several reasons: The capacitative currents that flow will be relatively smaller owing to the higher breakdown voltages of the collector junctions and the relatively smaller area of the avalanche diode. Since the current flowing through the transistors is not multiplied by avalanche multiplication, the steep negative resistance portion does not occur until currents approaching $I_h$ closely are reached. This is in contrast to the two terminal four layer device wherein a displacement current will cause injection of carriers which are multiplied at the avalanche junction and which in certain instances will suffice to trigger the device into its low impedance condition. In the FIGURE 2 circuit configuration injected carriers are not appreciably multiplied by avalanche effects at the collector junctions.

It should be noted that the features and characteristics of the circuit will be the same no matter whether the avalanche or "Zener" diode operates by the Zener mechanism or the avalanche mechanism except for the fact that Zener breakdown appears to occur only in junctions of relatively low breakdown voltage. (The relationship of these is discussed by W. Shockley in Semiconductor Products, vol. 1, No. 2, page 5, 1958.)

FIGURES 4–12 and 16 show novel four layer semiconductive devices and methods of fabricating the same which include the advantages of the aforementioned circuit in a single device.

Figure 4:
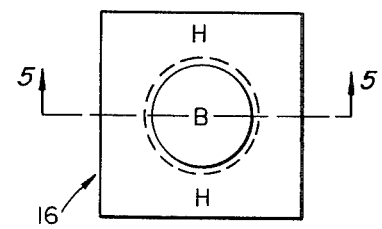
FIGURE 4 is a plan view of a four layer device incorporating the present invention.
Figure 5:
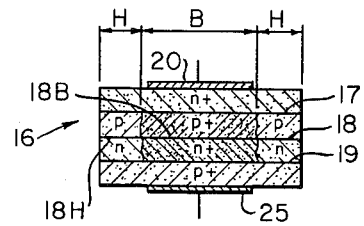
FIGURE 5 is a sectional view taken along the line 5—5 of FIGURE 4.

Referring to FIGURES 4 and 5, a four layer semiconductive device in accordance with the invention is illustrated. The device 16 is formed from a slice of semiconductive material which is treated to form successive layers with contiguous layers being of opposite conductivity type to form three junctions 17, 18 and 19. Thus, the device illustrated is essentially a four layer device. However, the device has two contiguous regions, B and H regions. The regions of the device denoted by B have inner p and n-type layers which are more heavily doped than the inner p and n-type layers in the adjacent contiguous surrounding H regions of the device. As a result, the center junction in the region 18B has a higher concentration gradient and a lower avalanche voltage than the center junction 18H. Since the region B includes center layers which are more heavily doped than the center layers of the H regions, it is harder to inject carriers from the outer layers across the junctions 17 and 19 into the B region than into the H region. It should be understood that the figures are not quantitative. The junctions in the actual device need not be plane and the transition from the B to the H region is not necessarily abrupt.

With reverse bias across the center junction 18, a current $I_o$, FIGURE 3, will flow through the device with avalanche multiplication occurring primarily in the inner or breakdown region. Breakdown for the portion 18B of the junction causes avalanche current to flow. This current tends to produce a forward bias across the junctions 17 and 19 in the holding region. When the current across the junctions 17 and 19 reaches a sufficiently high value, the sum of the alphas will approach unity and the device will exhibit a negative resistance characteristic, portion 14 of the curve, FIGURE 3. The voltage required to sustain conduction then drops and the sustaining current $I_h$ is required. As the voltage drops, the voltage across the center junction is decreased and the breakdown region conducts relatively small currents in comparison to the holding region.

Thus, the device operates essentially as the circuit shown in FIGURE 2 with the breakdown region operating as the diode and the holding region as the two transistors. The voltage at the middle junction 18H is so much below its breakdown or characteristic voltage that negligible current flows in this region. The same separation of function takes place in the structure described as takes place in the circuit arrangement of the prior art described with reference to FIGURE 2. However, the device shown in FIGURES 4 and 5 is a two terminal device which may be packaged in much the same manner as conventional four layer diodes. A method of constructing a device as shown will be presently described in detail. As for the circuit of FIGURE 2, the mechanism of breakdown in the B region may be either of the Zener or the avalanche form.

The voltage breakdown characteristics of the exposed junction do not play an important role in establishing the breakdown characteristics of the device since these are controlled by the breakdown region which is entirely surrounded by the guard regions having low concentration gradients at the center junction.

Figure 6:
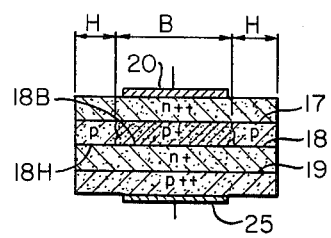
FIGURE 6 is a sectional view showing another four layer device which incorporates the invention.

Referring to FIGURE 6, another structure which produces substantially the same results as the structure of FIGURES 4 and 5 is shown. In this instance, only the middle p-type layer is more heavily doped. The middle n-type layer is more heavily doped than is the middle p-type layer in the holding region. In the breakdown region B, a more abrupt junction is formed between the heavily doped portion of the middle p-type layer and the adjacent n-type layer than occurs in the holding region H. It is thus evident that the breakdown will occur in the B region. If we suppose the n-p-n transistor reaches a high value of alphas, say eight or nine-tenths, at the same time that the p-n-p transistor reaches a value of, say, one or two-tenths (this difference arising from the fact that the base layer of the n-p-n transistor is less heavily doped than the base layer of the p-n-p transistor in the H region), then it is evident that because of the higher p+ base doping in the B-region, no appreciable contribution to the current in the breakdown region will occur from the alpha multiplication factors of the two transistors in the breakdown region until a total current is reached so that the holding condition has also been reached in the H region. Thus, the structure has the same advantages as that of FIGURE 4. Processes for forming the structure of FIGURE 6 will be presently described.

A further fact should be noted. That is, that an n++p+ junction is formed in the B region at the top of the device. This junction will have a high capacity because of its high concentration gradients and small spacing. This will help in overcoming the $dV/dt$ effect because with an abrupt surge of voltage most of the displacement current required to build up the voltage across the center p-n junction may be carried across the uppermost p-n junction as a displacement current across the relatively high capacity portion of the junction in the B-region. Thus, the displacement currents across the center junction are bypassed from the emitter junction of the n-p-n transistor in the H-region and this makes the structure even less susceptible to rapidly changing voltages.

Figure 7:
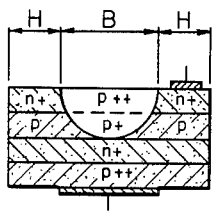
FIGURE 7 is a sectional view showing still another four layer device which incorporates the invention.

In FIG. 7, a different configuration is shown. This structure again includes a breakdown region and a contiguous holding region in a single four layer device. This structure may be formed by producing a conventional four layer diode and then by suitable masking and diffusion techniques, changing the impurity concentration in certain portions of the various regions, as will be presently described. The structure of FIG. 7 has an additional advantage over the structures previously described. That is, a high resistance layer of suitable ohmic material may be evaporated on the top surface. This will produce a resistive path across the emitter junction of the n-p-n transistor, and by controlling the magnitude of this resistance path, it is possible to control the current values at which large values of alpha are reached. This resistive path is equivalent to connecting resistors across the emitter junction, discussed in the aforementioned Patent No. 2,655,609.

Figure 8:
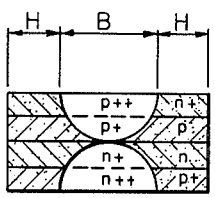
FIGURE 8 shows still another four layer device which incorporates the invention.

FIG. 8 shows a structure similar to that of FIG. 7 which has lower breakdown voltages. This structure is produced by a diffusion of an n-type insert on one side and a p-type insert from the other side in accordance with methods to be presently described. It is evident that the breakdown voltage in the B region can be controlled independently of the characteristics of the holding region. Thus, it is possible to make a modified four layer semiconductive device with extremely low breakdown voltage while simultaneously maintaining extremely low holding currents.

Figure 9:
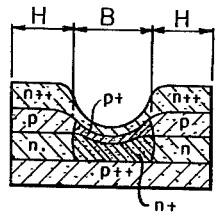
FIGURE 9 shows still another four layer device which incorporates the invention.

With reference to FIG. 9, another semiconductive device having the characteristics described is shown. The device is formed as follows: A conventional four layer diode structure is produced. Subsequent to this, hollows representing the B (breakdown) region are etched in the four layer diode. Into these hollows are diffused n+, p+ and n++ layers in the order designated. These layers will be connected to the adjacent layers of the holding regions so as to produce a small central region having the same characteristics as those produced in the other units. The structure of FIG. 9 may obviously be made of opposite conductivity types and the hollows may be formed by various means. A method of forming devices of the type as described will be presently described.

In FIG. 10, a slice of semiconductive material 21 which may, for example, be p-type material of 50 micron thickness with conductivity of between 5–10 ohms cm. is exposed to oxygen at relatively high temperatures whereby silicon dioxide protective layers 22 and 23 are formed on the surfaces. Techniques of oxide masking are discussed by C. J. Frosch and Derick in the Journal of the Electrochemical Society, vol. 104, p. 547. An array of holes 24 is then etched through the silicon dioxide layer. This may be done by protecting the remainder of the layer with a wax mask, by photoresist techniques, or other techniques well known in the art. The slice is then placed in a bath which serves to etch away the silicon dioxide layer and expose the underlying p-type material.

Figure 11:
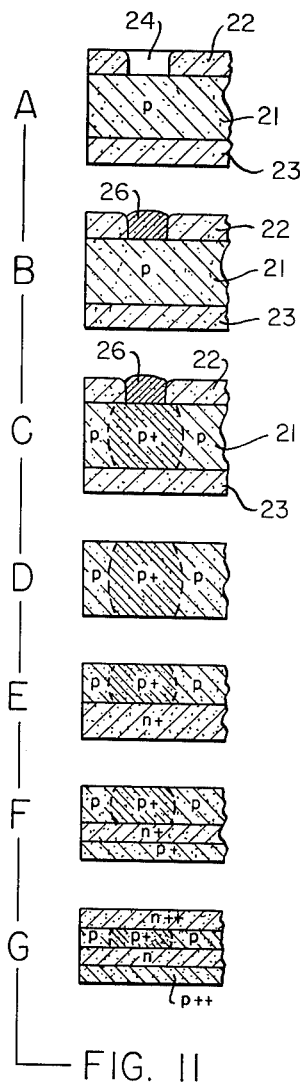

In FIG. 11 a sectional view showing the portion 11 of FIG. 10 is illustrated. Boron may be predeposited into the holes or windows 24 by evaporation techniques to form a layer of boron 26 in contact with the underlying p-type material as shown in FIG. 11B. The boron may, for example, be deposited from $BCl_3$ gas flowing at approximately 3 ml./minute in the presence of $N_2$ gas flowing at approximately 200 ml./minute through a tube of about 28 to 30 mm. inside diameter at 1040° C. for thirty minutes. The temperature of the wafer is then increased in a suitable atmosphere, for example, by heating to 1300° C. for a relatively long time, about 24 hours to diffuse the boron substantially through the wafer. The boron will diffuse into the underlying p-type layer to form a p+ region of the type shown in FIG. 11C. The slice may then be treated by suitable techniques, for example, by lapping, or etching to remove the upper and lower silicon dioxide layers and the boron thereby leaving a slice of the type shown in FIG. 11D. The slice includes p+ inserts in p-type material. The concentration in the p+ region near the top surface is in the order of $10^{18}$ atoms cm.$^{-3}$ as compared to less than $10^{15}$ atoms cm.$^{-3}$ in the surrounding p region.

The upper surface is then masked and the wafer is heated in an atmoshere including donor impurities whereby an n+ layer is formed, FIG. 11E. This layer may be produced by diffusing phosphorus from a $P_2O_5$ source at 1100° C. for 30 minutes. This gives an n+ layer 3–4 microns thick with surface concentration of about $10^{20}$ atoms cm.$^{-3}$. The breakdown voltage in the p+n+ region will be substantially lower than that in the pn+ region. If the slice is diced at this step, a plurality of avalanche diodes of the type shown in FIG. 19 is formed. The diodes have an inner region in which avalanche breakdown occurs and a surrounding (guard) region which protects the device from the surrounds whereby the avalanche breakdown voltage is immune to external conditions.

A subsequent diffusion is carried on in the presence of acceptors to provide a p++ layer, FIG. 11F. The p++ layer can be produced by diffusing a thin, highly doped layer on top of the n+ layer. A boron predeposit at 1100° C. for 10 minutes would suffice to make an emitter 1–2 microns deep. If the slice is diced at this step, a plurality of transistors are formed which are relatively immune to surrounding conditions. A transistor in accordance with the foregoing is illustrated in FIG. 20. It is observed that the transistor has an inner region with a surrounding (guard) region.

Subsequently, the lower surface is masked and the upper surface is exposed to a final diffusion to produce an n++ layer at the top suface, FIG. 11G. The formation of this layer is the same as that of the n+ layer described above. In actual practice, both n+ layers can be formed by the same step. Thus, a four layer device results which has two regions, a region B having high concentration junction, and a region H. The device is of the type described with reference to FIG. 6. It is, of course, to be understood that the above is illustrative only. The original slice may be of different conductivity type and the predepositing may be varied. The diffusion time will depend on the character of the original block or slice, the temperature and the like.

Figure 12:
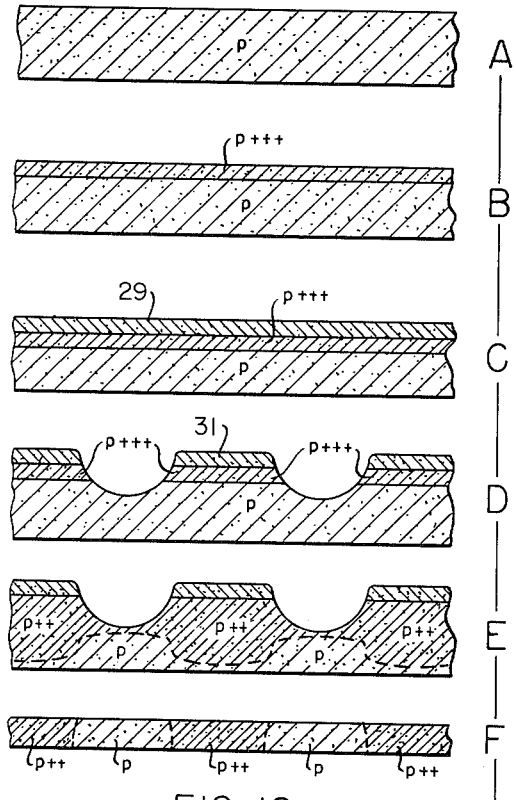

Referring to FIG. 12, an alternate method of producing p-type inserts of the type discussed is shown. In this case a slice of p-type material, FIG. 12A, is exposed to an acceptor impurity to produce a highly doped surface layer designated by p+++, FIG. 12B. Subsequent to this, a protective layer 29 is formed over the entire surface, FIG. 12C. The layer is then operated upon to form a plurality of windows which expose the underlying p+++ material. The slice is then placed in an etching solution whereby material is removed to leave a set of mesas or islands 31. The wafer shown in FIG. 12D is then heated whereby the acceptor impurities diffuse into the underlying p-type region. This gives a layer which is doped substantially as indicated in FIG. 12E. The slice is subsequently lapped in a conventional manner to produce a slice of requisite thickness having a plurality of p++ inserts as indicated in FIGURE 12F. This slice may then be treated as previously described with reference to FIG. 11 to form diodes, transistors and four layer devices.

Referring to FIGURE 13, another method of forming a device in which the edge portions play a relatively unimportant role in establishing the characteristics of the device is shown. A block of material having p and n-type regions forming a p-n junction is formed by conventional methods, FIGURE 13A. The block may have the desired regions formed by rate growing, diffusion, or the like well known technique. For example, if the diffusion technique is employed to form a block, a block of n-type material may be subjected to a diffusion in the presence of acceptors to form a p-type layer. Preferably, the two layers should have low concentration gradients so that the unbalanced chemical charge density due to donors and acceptors (which produces the net charge density in the space charge region under conditions of reverse bias) is small on both sides of the junction; or, alternatively, if counter doping of the melt is used to produce the junction, the unbalanced chemical charge density should be small on at least one side of the junction so that in any event the unbalanced chemical charge density near the junction corresponds to a high voltage breakdown.

A hole or pit 41, FIGURE 13B, is made to such a depth that it extends into the n-type region. The pit may be formed by masking the block, forming a window in the mask and then subjecting the block to an etching solution. The resulting structure is then subjected to a diffusion in the presence of acceptors whereby the acceptor atoms diffuse into the material to form a relatively thin p+ layer 42 of high impurity concentration at the bottom of the depression. The upper edges of the layer merge with the p-type material to form a continuous connection therewith. In the same diffusion, a small p-type skin is formed all over the device, FIGURE 13C. The device is polished, etched or the like to remove the p-type skin and to give a resulting structure of the type shown in FIGURE 13D. It is observed that in FIGURE 13D, the p and n regions extending to the surface of the device are relatively thick, and the concentration gradient at the surface is relatively low. The junction at the surface is, therefore, relatively immune to external conditions. However, the operating region near the bottom of the depression has relatively thin regions with only the outer surface of the p-type and n-type material exposed to surrounding conditions. Suitable contacts 43 and 44 are formed using well known techniques. The operating region is of relatively high concentration gradient, and has a lower breakdown voltage than the outer surrounding region. The outer region plays a relatively unimportant role in establishing the characteristics of the device.

Referring to FIGURE 15, an n-p-n transistor embodying the invention is illustrated. As illustrated, the portions of the regions which extend to the surface are relatively thick and the operating portions at the bottom of the pit 46 have a region of the required concentration gradient and thickness. The device illustrated may, for example, be made by employing a solid block of n-type material, a diffusion in the presence of acceptor impurities will form a p-type layer deep into the n-type base. A subsequent diffusion in the presence of donor atoms forms an n-type layer on top of the p-type layer. A block of material having n-p and n regions is then formed. Preferably, the diffused p-type and n-type layer are of low concentration gradients so that they will have a high voltage breakdown. Subsequent to the formation of the n-type and p-type layers, a pit 46 is formed in the material. The pit extends downwardly into the n-type base region. A thin p-type layer is then diffused into the pit. Preferably, the top n-type layer is masked against the p-type impurity or else the impurity concentration is less than the concentration of the n-type layer.

Diffusion in the presence of acceptor impurities will produce a p-n junction at the bottom of the pit and connect the p-type layer all the way around the side of the pit.

An n-type layer is then formed by diffusion in the presence of donor atoms, this layer being produced on top of the thin p-type layer. This layer will join the n-type layer all around the inside of the pit. The device is then masked and chemically etched and machined to remove all skin regions formed around the device. A device of the type shown in FIGURE 15 results. The base, collector and emitter contacts 47, 48 and 49 can be made with relative ease to the thick n-p-n regions.

Referring to FIGURE 18, the p-type diffusion region may extend over the p-type layer of FIGURE 13D. The emitter region is subsequently diffused through a hole etched in a mask. This permits making both emitter contact 49 and base contact 50 on the top surface of the device.

In FIGURE 16, a device similar to that of FIGURE 15 is subjected to an additional diffusion in the presence of acceptor atoms to form a p++ layer. The device of FIGURE 16 is, therefore, a p-n-p-n switching device which has two contiguous regions, one a breakdown region and one a holding region. Ohmic contacts 53 and 54 are made to the bottom layer and to the p-type layer at the bottom of the pit 46.

By varying the relative concentrations and thicknesses of the inner and outer regions of FIGURE 16, the holding current may be caused to flow chiefly in the outer region or chiefly in the inner region. In the latter case, the outer region acts as a guard region for breakdown voltage and also as a capacitative bypass for displacement currents arising from the $dV/dt$ effect.

To illustrate the flexibility of the process, a p-n-p device is shown in FIGURE 17. This device is formed by starting with a block of p-type material and then diffusing to form regions of low concentration gradient. A pit 51 is formed which extends down into the base p-type layer. Subsequent diffusions of donor and acceptor impurities, in the manner previously described, form the thin n+ and p regions which become the working or breakdown regions of the device.

In FIGURE 21 a device similiar to that shown in FIGURES 13A–D is illustrated. The device of FIGURE 21 is formed by not removing the p+ layer on the top surface of the device and forming ohmic contact 43 to the top surface. Likewise, the device of FIGURE 22 is similar to that of FIGURE 15. However, the n+ layer is not removed and ohmic contact 49 is made to the top surface.

Thus, it is seen that there is provided a semiconductive device which is relatively immune to external conditions. The carrier multiplication through avalanche breakdown occurs at lower voltages in a region of the device which is removed from the surface whereby the avalanche characteristics are not effected by external conditions. A four layer device is illustrated in which the avalanche breakdown is controlled by the center region and the holding characteristics are controlled by the surrounding region. It is observed that in each of these devices there is an inner region which controls the characteristic voltage of the device and a surrounding or guard region which makes the device relatively immune to external conditions.

I claim:

1. A semiconductor device comprising a body of one conductivity type and at least one region of opposite conductivity type having a first concentration of unbalanced chemical charges forming a junction therewith, a recess formed in one region of the device in the central portion thereof and extending through the region of opposite conductivity type into said body, said recess being surrounded on all sides by said region of opposite conductivity type, a relatively thin region of said opposite conductivity type having a higher concentration of unbalanced chemical charges than said first concentration merging at its edges with the region of opposite conductivity type whereby the thin region plays the predominant role in establishing the reverse breakdown voltage characteristics of the device.

2. A semiconductor device comprising a body of one conductivity type and at least two regions on one surface thereof, one of said regions being of opposite conductivity type and forming a junction therewith, and the other region being of the same conductivity type and having a first concentration of unbalanced chemical charges forming a junction with said one region, a recess formed in said one surface of the device and extending through said regions into said body, a region of said opposite conductivity type having a higher concentration of unbalanced chemical charges than said one region forming a junction with the body at the base of the recess and connected to said one region, and a second region of said one conductivity type forming a junction with said region of opposite conductivity type and making electrical contact to the other region, thereby forming a pair of continuous junctions with the junction at the central portion having a first concentration of unbalanced chemical charges on at least one side of the junction and the portions at the edge of the device having a lower concentration of unbalanced chemical charges than said first concentration on at least said one side of the junction whereby the central portion plays a predominant role in establishing the reverse breakdown voltage characteristics of the device.

3. A device as in claim 2 together with an additional junction of opposite conductivity type in said recess forming a junction with said second region.

4. A semiconductor device including a first region of semiconductive material of one conductivity type and a second contiguous region of semiconductive material of opposite conductivity type forming a junction therewith, at least one of said regions of said device having two contiguous portions to define with said other region two junction portions, an inner junction portion having a first concentration of unbalanced chemical charges for the corresponding junction portion and an outer junction portion which completely surrounds the inner junction portion having a lower concentration of unbalanced chemical charges of the same polarity than the inner junction portion effective to produce a higher reverse breakdown voltage in the outer junction portion than at the inner junction portion.

5. A semiconductor device comprising a body of semiconductive material of one conductivity type and at least one region of opposite conductivity type formed on one surface thereof to define a junction therewith, said region of opposite conductivity type completely surrounding a center portion, said center portion having a first concentration of unbalanced chemical charges on at least one side of the junction for the corresponding portion of the junction, and said thicker surrounding outer portion having a lower concentration of unbalanced chemical charges of the same polarity as the first portion on the same side of the junction effective to produce a higher reverse breakdown voltage at the surrounding junction portion of said device than at the inner junction portion.

References Cited by the Examiner

UNITED STATES PATENTS

| | | | |
|---|---|---|---|
| 2,813,048 | 11/1957 | Pfann | 148—1.5 |
| 2,936,425 | 3/1960 | Shockley | 317—235 |
| 2,937,114 | 5/1960 | Shockley | 148—33 |
| 2,938,130 | 5/1960 | Noll | 148—33 |
| 2,967,985 | 1/1961 | Shockley et al. | 148—1.5 X |
| 3,007,090 | 10/1961 | Rutz | 317—235 |
| 3,099,591 | 7/1963 | Shockley | 148—33 |

DAVID L. RECK, *Primary Examiner.*